United States Patent
Nemkov et al.

(10) Patent No.: US 7,617,658 B2
(45) Date of Patent: Nov. 17, 2009

(54) SEALING DEVICE FOR PRODUCING SEALED PACKAGES OF A POURABLE FOOD PRODUCT

(75) Inventors: Valentin Nemkov, White Lake, MI (US); Nikolay Madzharov, Drianovo (BG)

(73) Assignee: Tetra Laval Holdings & Finance SA, Pully (CH)

( * ) Notice: Subject to any disclaimer, the term of this patent is extended or adjusted under 35 U.S.C. 154(b) by 169 days.

(21) Appl. No.: 11/667,103

(22) PCT Filed: Nov. 3, 2005

(86) PCT No.: PCT/EP2005/055739

§ 371 (c)(1),
(2), (4) Date: May 17, 2007

(87) PCT Pub. No.: WO2006/048441

PCT Pub. Date: May 11, 2006

(65) Prior Publication Data

US 2008/0289303 A1    Nov. 27, 2008

(30) Foreign Application Priority Data

Nov. 5, 2004  (EP)  .................................. 04105565

(51) Int. Cl.
*B65B 9/06* (2006.01)
*B65B 7/00* (2006.01)
(52) U.S. Cl. .......................... 53/551; 53/451; 53/376.2; 53/DIG. 2
(58) Field of Classification Search ................ 53/375.9, 53/376.2, 451, 477, DIG. 2, 550–552; 156/272.2, 156/273.7, 274.2, 380.1, 380.2, 380.4; *B29C 65/02*
See application file for complete search history.

(56) References Cited

U.S. PATENT DOCUMENTS 4,009,068 A  *  2/1977  Boussageon ............. 156/380.4

(Continued)

FOREIGN PATENT DOCUMENTS

EP          0 274 641 B1      7/1988

(Continued)

OTHER PUBLICATIONS

PCT/ISA/210, dated Feb. 13, 2006.

(Continued)

*Primary Examiner*—Paul R Durand
(74) *Attorney, Agent, or Firm*—Buchanan Ingersoll & Rooney PC

(57) ABSTRACT

A sealing device producing sealed packages filled with pourable food product from sheet packaging material comprises a supporting frame, a forming mechanism movable with respect to the frame along a path to fold the sheet packaging material, a sealing arrangement carried by the forming mechanism to seal the sheet packaging material and form the packages, and an electromagnetic power device supplying electric energy to the sealing arrangement. The power device comprises at least one primary winding fixed to the frame and connectable to an electric energy source, and a secondary winding movable along the path, powering the sealing arrangement, and receiving electric energy by electromagnetic induction from the primary winding as the secondary winding travels past the primary winding. When interconnected by electromagnetic induction, the primary and secondary windings are so arranged as to have respective adjacent portions interjacent in a first direction crosswise to the forming mechanism movement path.

11 Claims, 4 Drawing Sheets

U.S. PATENT DOCUMENTS

| | | | |
|---|---|---|---|
| 4,074,504 A * | 2/1978 | Greenawalt et al. | 53/433 |
| 4,380,484 A * | 4/1983 | Repik et al. | 156/251 |
| 4,546,596 A * | 10/1985 | Cherney | 53/451 |
| 4,637,199 A * | 1/1987 | Steck et al. | 53/451 |
| 4,825,625 A * | 5/1989 | Hufford | 53/451 |
| 5,787,681 A * | 8/1998 | Papina et al. | 53/373.7 |
| 6,035,604 A | 3/2000 | Gustafsson | 53/64 |
| 7,104,028 B2 * | 9/2006 | Paradisi et al. | 53/374.5 |
| 7,299,604 B2 * | 11/2007 | Kammler et al. | 53/451 |
| 2007/0017189 A1 * | 1/2007 | Konno et al. | 53/551 |
| 2008/0092492 A1 * | 4/2008 | Konno | 53/477 |

FOREIGN PATENT DOCUMENTS

| | | |
|---|---|---|
| EP | 0 615 907 A1 | 9/1994 |
| EP | 0 732 190 A2 | 9/1996 |
| EP | 732190 A2 * | 9/1996 |
| EP | 0 887 263 B1 | 12/1998 |
| EP | 0 887 265 A1 | 12/1998 |
| EP | 0 887 270 B1 | 12/1998 |
| EP | 0 887 273 B1 | 12/1998 |
| JP | 11-54349 A | 2/1999 |
| JP | 2002-135902 A | 5/2002 |
| JP | 2004-312806 A | 11/2004 |
| WO | 00/64662 A2 | 11/2000 |

OTHER PUBLICATIONS

PCT/ISA/237, dated Feb. 13, 2006.

* cited by examiner

SEALING DEVICE FOR PRODUCING SEALED PACKAGES OF A POURABLE FOOD PRODUCT

TECHNICAL FIELD

The present invention relates to a sealing device for producing sealed packages of a pourable food product.

BACKGROUND ART

As is known, many pourable food products, such as fruit juice, pasteurized or UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material normally has a multilayer structure comprising a layer of fibrous material, e.g. paper, covered on both sides with layers of heat-seal plastic material, e.g. polyethylene.

In the case of aseptic packages for long-storage products, such as UHT milk, the packaging material comprises a layer of barrier material, e.g. a sheet of aluminium or EVOH, which is superimposed on a layer of heat-seal plastic material, and is in turn covered with another layer of heat-seal plastic material eventually forming the inner face of the package contacting the food product.

As is known, packages of this sort are produced, for instance, on fully automatic packaging machines, on which a continuous tube is formed from the web-fed packaging material. More specifically, the web of packaging material is unwound off a reel and fed through an aseptic chamber on the packaging machine, where it is sterilized, e.g. by applying a sterilizing agent such as hydrogen peroxide, which is subsequently evaporated by heating, and/or by subjecting the packaging material to radiation of appropriate wavelength and intensity; and the sterilized web is maintained in a closed, sterile environment, and is folded into a cylinder and sealed longitudinally to form a continuous tube in known manner.

The tube of packaging material, which in effect forms an extension of the aseptic chamber, is fed in a vertical direction, is filled with the sterilized or sterile-processed food product, and is fed through a sealing device to form the individual packages. That is, inside the sealing device, the tube is sealed at a number of equally spaced cross sections to form a continuous strip of pillow packs connected to one another by respective transverse sealing bands, i.e. extending perpendicularly to the travelling direction of the tube. The pillow packs are separated by cutting the relative transverse sealing bands, and are conveyed to a folding station where they are folded mechanically to form respective finished parallelepiped-shaped packages.

Packaging machines are known, as described for example in European Patent EP-B-0887265, which comprise two chain conveyors defining respective endless paths and fitted with respective numbers of sealing jaws. The two paths have respective branches substantially facing and parallel to each other, and between which the tube of packaging material is fed so that the jaws on one conveyor cooperate with corresponding jaws on the other conveyor along said branches of the respective paths, to grip the tube at a number of successive cross sections, and to seal and cut the packages.

Packaging machines are also known comprising only two pairs of jaws, which act alternately on the tube of packaging material to grip and seal, e.g. heat seal, it along a number of equally spaced cross sections.

As the sealing operation is completed, a cutter, carried, for example, by one of the jaws in each pair and interacting with the tube of packaging material, is activated to cut it along a centre line of the cross section just sealed, and so detach a pillow pack from the bottom end of the tube of packaging material. The bottom end being sealed transversely, the relative jaws, on reaching the bottom dead-centre position, can be opened to avoid interfering with the top portion of the tube. At the same time, the other pair of jaws, operated in exactly the same way, moves down from the top dead-centre position, and repeats the above grip/form, seal and cut process.

Alternatively, the packaging material may be cut into blanks, which are formed into packages on forming spindles, and the resulting packages are filled with the food product and sealed. One example of such a package is the so-called "gable-top" package commonly known by the trade name Tetra Rex (registered trademark).

More specifically, a succession of sheets of packaging material are fed to the machine and are folded to superimpose and seal the opposite edges in order to form respective substantially tubular or sleeve-shaped blanks open at both ends.

The tubular blanks are fed onto respective forming spindles movable along a given path; in particular, the spindles are commonly part of a conveyor, on which folding and sealing operations are performed.

More precisely, the tubular blanks are sealed at one end, filled with the pourable food product and then sealed at the opposite end to form a finished package.

In the above described types of packaging machines, the sealing operations are performed by gripping the packaging material between two pressure members and by supplying energy to heating means carried by one of the pressure members in order to obtain locally melt of the layers of heat-seal plastic material gripped between the pressure members.

In the case of jaw-type packaging machines, the pressure members are defined by the pairs of jaws acting on the tube of packaging material whilst, in the case of spindle-type packaging machines, the portion of packaging material to be sealed is generally gripped between one end of a relative spindle and a heating member movable towards and away from such spindle.

When the packages to be formed are of the aseptic-type with a layer of electrically conductive material, typically aluminium, as the barrier material, the sealing operations are normally performed by induction of electric loss current in the aluminium layer, so as to melt the heat-seal plastic material locally.

More specifically, one of the two pressure members between which the packaging material is gripped comprises a main body made of non-conductive material, and an inductor housed in a front seat on the main body; and the other pressure member has pressure pads made of flexible material, e.g. rubber.

The inductor is powered when the pair of pressure members grips the packaging material to seal a section thereof by heat sealing the plastic cover material.

In the case of packages with no layer of aluminium or other electrically conductive material, e.g. packages with an EVOH barrier layer, the sections of the packaging material are normally sealed using a hot bar to locally heat the packaging material inwards.

More specifically, one of the two pressure members, between which the packaging material is gripped, is fitted with the hot bar, while the other is normally fitted with one or more pressure pads of flexible material. The so-called "hot-bar" sealing method described calls for relatively prolonged contact between the hot bar and the packaging material.

To accelerate localized melting of the packaging material, and so increase package production speed, ultrasound sealing devices are widely used. These substantially comprise a mechanical-vibration generator, or sonotrode, and an anvil, e.g. as described in EP-B-615907, which are fitted to a respective pair of pressure members, and cooperate mutually to heat the packaging material by ultrasound vibration.

In all the above solutions, the heating or sealing means movable with the relative jaws or with the carrousel conveyor must be powered electrically by a fixed electric energy source at a predetermined point along the path of the heating means. In other words, electric energy must be transferred from a fixed source to a movable user device along a portion of the user device path.

This can be done using substantially two known methods, each of which, however, has drawbacks and limitations.

In a first method, the pressure members fitted with the heating means are also fitted with brushes preferably made of carbon, and which, along a predetermined portion of their travel, slide along respective copper power bars fixed to the packaging machine frame.

Rapid wear of the brushes and unstable contact between the brushes and the power bars are the main drawbacks of this method, which, moreover, tend to get worse as the output rate of the packaging machine increases.

To eliminate these drawbacks, over the past few years, a method has been perfected whereby electric energy is transferred from the fixed source to the movable user device by electromagnetic induction. One example of this method applied to chain-type packaging machines is described in Patent Application WO 00/64662, and a similar example, applied to a packaging machine featuring only one pair of jaws, is described in Patent EP-B-0732190.

In both cases, electric energy is transferred from a transmission unit, fixed to the packaging machine frame, to a receiving unit fitted to one of the jaws in a relative pair.

The transmission unit has a fixed magnetic core fitted with a primary winding connected to the electric energy source, and the receiving unit has a movable magnetic core integral with the body of the relative jaw and fitted with a secondary winding connected to the heating means. As the receiving unit travels past the transmission unit, electric current is induced in the secondary winding to power the heating means.

There being no contact between the receiving and transmission units, the above method solves the problem of wear.

On the other hand, the electric energy transfer systems by induction described in the above documents are inefficient and highly sensitive to variations in the air gap between the transmission and receiving unit cores. Since the size of the air gap depends on inevitable connection tolerances of the packaging machine component parts, the solutions described in the above documents fail to ensure, at present, the necessary reliability of the energy transfer system employed.

Patent Application WO 00/64662, in particular, employs an opposed E configuration for the fixed and movable cores. More specifically, each core comprises a bar portion, from which three parallel branches extend perpendicularly and, in use, face corresponding branches of the other core.

Tests conducted by the Applicant on this type of core configuration of the transmission and receiving units show a considerable increase in magnetic flux dispersion and in magnetizing current alongside small increases in the air gap between the fixed and movable cores.

In FIGS. 7 and 8, curves $W_3$ and $M_3$ show, for the opposed E configuration of the fixed and movable cores, apparent power and magnetizing current alongside an increase in the air gap between the cores. As can be seen, the curves are characterized by relatively high apparent power and magnetizing current values, and slope steeply, thus confirming the extreme sensitivity of the WO 00/64662 solution to variations in the air gap between the fixed and movable cores.

DISCLOSURE OF INVENTION

It is an object of the present invention to provide a sealing device for producing sealed packages of a pourable food product, designed to eliminate, in a straightforward, low-cost manner, the aforementioned drawbacks typically associated with known sealing devices, and which, in particular, employs an efficient electromagnetic electric energy transfer system insensitive to the air gap between the fixed transmission portion and the movable receiving portion.

According to the present invention, there is provided a sealing device for producing sealed packages of a pourable food product as claimed in claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
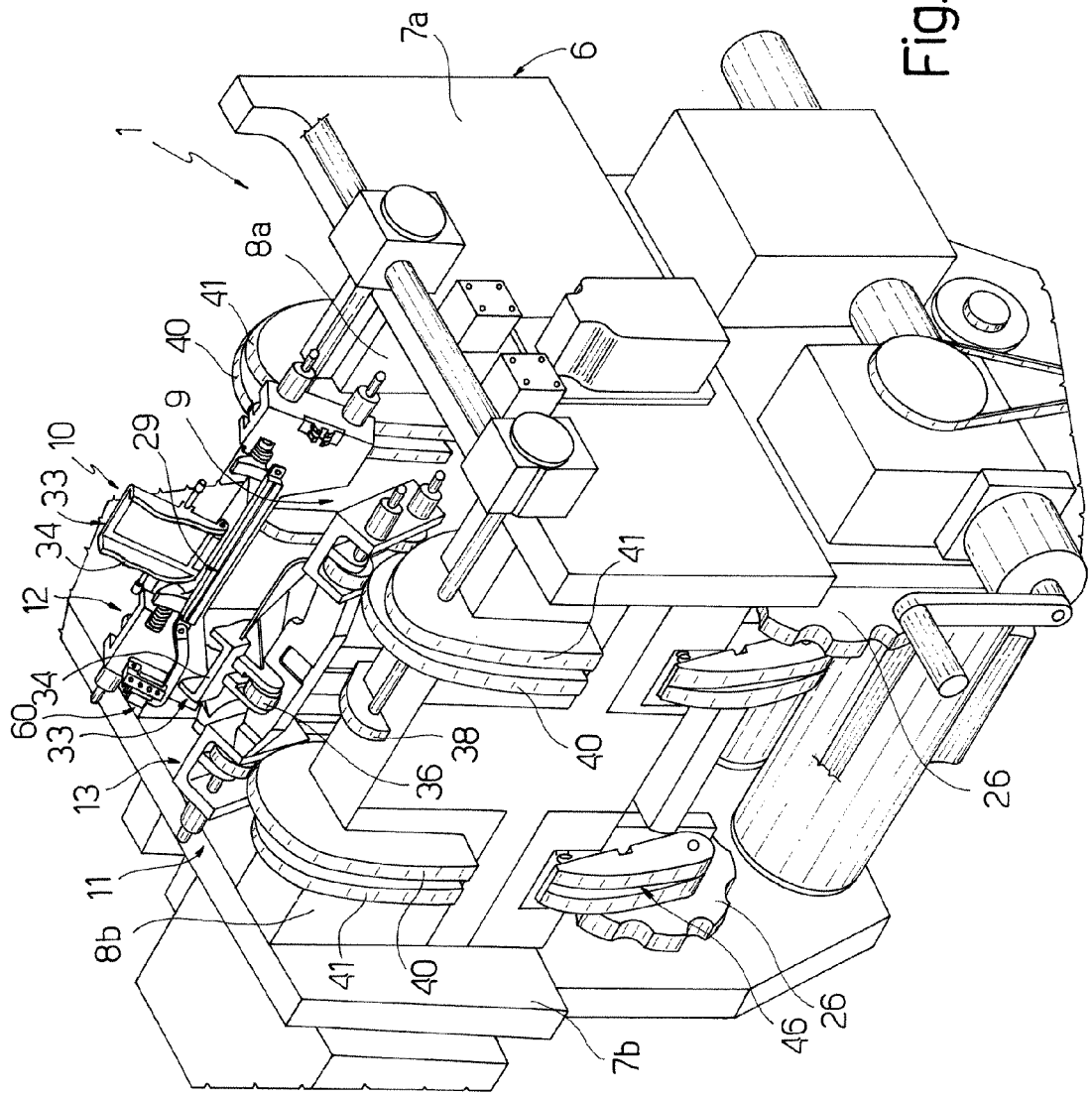
FIG. 1 shows a view in perspective, with parts removed for clarity, of a sealing device in accordance with the teachings of the present invention.
Figure 2:
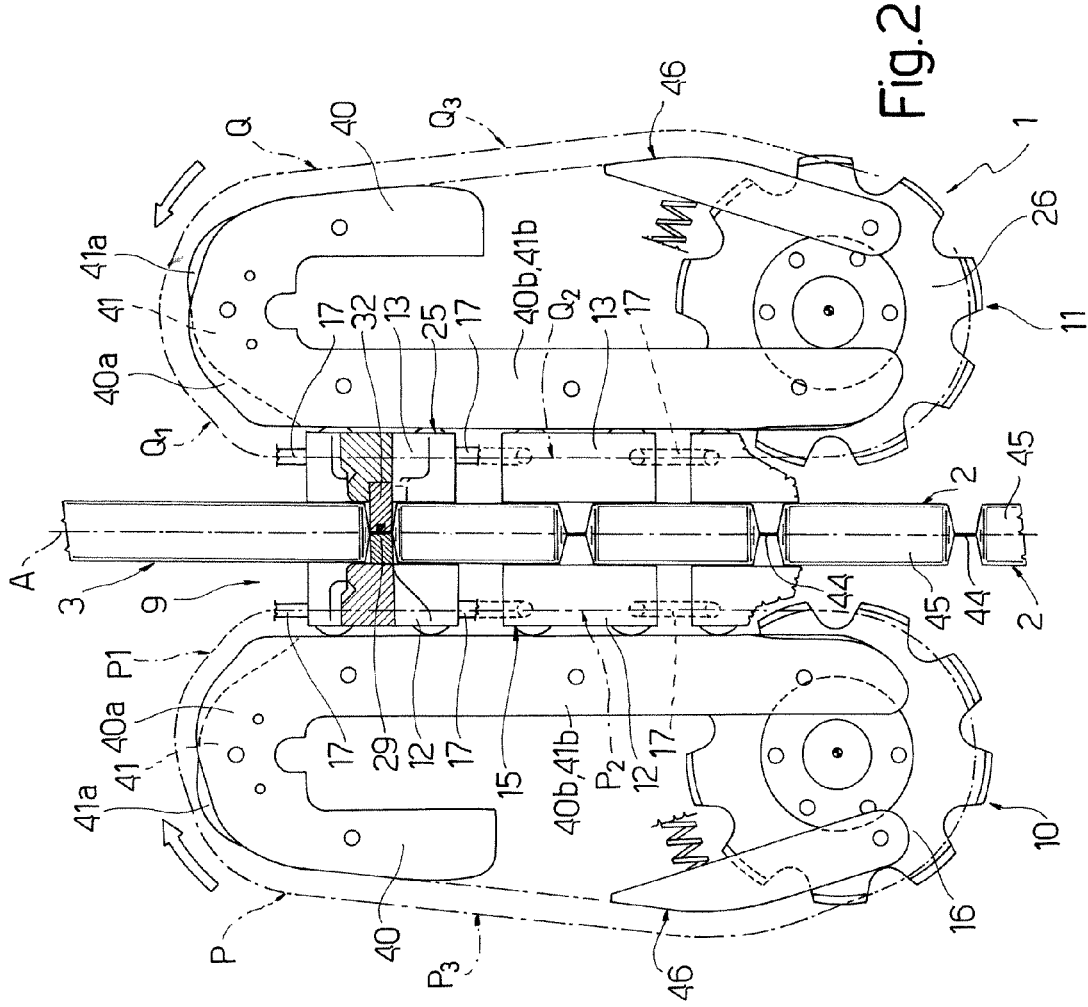
FIG. 2 shows a schematic side view of the FIG. 1 sealing device.

Number 1 in FIGS. 1 and 2 indicates as a whole a sealing device for continuously producing sealed packages 2 of a pourable food product, such as pasteurized or UHT milk, fruit juice, wine, etc., from a tube 3 of packaging material.

Tube 3 is formed in known manner, upstream from device 1, by longitudinally folding and sealing a web of heat-seal sheet material, and is filled with the sterilized or sterile-processed food product for packaging.

Device 1 comprises a frame 6 (FIGS. 1 and 3) defined by two side walls 7a, 7b, and by two parallel transverse walls 8a, 8b fixed rigidly between side walls 7a, 7b to define, with side walls 7a, 7b, a cavity 9; and two chain conveyors 10, 11 supported by frame 6 and having respective jaws 12, 13 (only one pair of which is shown in FIG. 1) which cooperate with one another to interact with tube 3 of packaging material fed along a vertical path A through cavity 9.

With particular reference to FIG. 2, conveyors 10, 11 define respective endless paths P, Q, along which jaws 12, 13 are fed, and which extend about respective walls 8a, 8b of frame 6.

Conveyor 10 comprises an articulated chain 15 extending along path P; and two drive wheels 16 meshing with both sides of chain 15 at the bottom end of path P. Jaws 12 are an integral part, and define alternate links, of chain 15, and are connected to one another in articulated manner by pairs of rods 17.

More specifically, each jaw 12 (FIGS. 1-3) comprises a main body 20, which is elongated in a direction B perpendicular to path A and to side walls 7a, 7b, and has respective end enlargements 21, 22, from each of which project a first and second pin 23, 24 having axes C, D spaced apart and parallel to direction B. Rods 17 pivot on pins 23, 24 of jaws 12 to connect pins 23 of one jaw 12 to pins 24 of the adjacent jaw 12.

In the same way, conveyor 11 (FIGS. 1 and 2) comprises an articulated chain 25 extending along path Q; and two drive wheels 26 meshing with chain 25 at the bottom end of path Q. Chain 25 is defined by a number of jaws 13 connected to one another in articulated manner, and only described in detail insofar as they differ from jaws 12, and as required for a clear understanding of the present invention. Parts of jaws 13 identical or corresponding to parts of jaws 12 described are indicated using the same reference numbers. Briefly, each jaw 13 comprises a main body 20 having pairs of end pins 23, 24, on which pivot rods 17 connecting adjacent pairs of jaws 13.

Each jaw 12 (FIGS. 1 to 3) comprises a heating member 29 fitted to main body 20, parallel to direction B, and defined, in the example shown, by an inductor powered electrically as described in detail later on.

Alternatively, each jaw 12 may house a different type of heating member, e.g. a sonotrode powered electrically for ultrasound sealing.

Instead of beating member 29, each jaw 13 comprises a pressure bar 32, which cooperates with heating member 29 of the corresponding jaw 12 to grip a cross section of tube 3 (FIG. 2), and has, at the front, one or more bands of relatively flexible elastomeric material.

Jaws 12 and 13 (FIGS. 1 and 3) also comprise respective devices 33 for controlling the volume of packages 2 when sealing the packages. Each device 33—which is known, for example, from EP-B-0887265, and therefore not described in detail—substantially comprises a half-shell 34 hinged to main body 20, about an axis parallel to axes C, D, by two supporting brackets integral with half-shell 34.

As shown in FIG. 1, each half-shell 34 cooperates at the front with a complementary half-shell 34 to form a substantially parallelepiped-shaped cavity for housing a package 2 being formed. Each device 33 also comprises a cam follower roller 36 fitted idly to a supporting bracket in turn fitted integrally to the back of the relative half-shell 34.

Cam follower rollers 36 of jaws 12 and 13 cooperate with respective cams 38 fitted to walls 8a and 8b of frame 6, and of which only the one associated with conveyor 11 is visible in FIG. 1.

The movement of jaws 12 and 13 is controlled by respective pairs of cams 40, 41 fitted to walls 8a, 8b of frame 6 and cooperating with respective pairs of cam follower rollers 42, 43 fitted to end enlargements 21, 22 of jaws 12 and 13. The rollers 42, 43 in each pair are coaxial with pins 24, 23 respectively, and are offset axially with respect to each other so as each to cooperate with the respective cam 40, 41.

More specifically, wall 8a (FIGS. 1 and 2) is fitted with two pairs of cams 40, 41 which cooperate with respective pairs of rollers 42, 43 on jaws 12; and, similarly, wall 8b is fitted with two pairs of cams 40, 41 which cooperate with respective pairs of rollers 42, 43 on jaws 13.

Cams 40, 41 have respective substantially U-shaped portions 40a, 41a extending about top edges of respective walls 8a, 8b, to define return portions, opposite respective drive wheels 16 and 26, for respective chains 15, 25 of conveyors 10, 11; and respective portions 40b, 41b extending along respective walls 8a, 8b, inside cavity 9. Portions 40a, 41a define portions $P_1$, $Q_1$ of the two paths P, Q, along which jaws 12 and 13 move towards each other and impact tube 3 of packaging material; and portions 40b, 41b define facing, substantially parallel portions $P_2$, $Q_2$ of the two paths P, Q, along which jaws 12 and 13 are maintained contacting under pressure to form the seals bounding packages 2 at respective substantially flat transverse sealing bands 44. A continuous strip is thus formed, comprising a number of parallelepiped-shaped container portions 45 connected to one another by sealing bands 44, which are cut either along path P or downstream from device 1 to form packages 2.

Cams 40, 41 release relative chains 15, 25 at respective portions $P_3$, $Q_3$ of paths P, Q, at the output of respective drive wheels 16, 26.

Along portions $P_3$, $Q_3$, chains 15, 25 cooperate with respective pairs of tensioners 46 for keeping chains 15, 25 sufficiently taut to ensure contact between rollers 42, 43 of jaws 12, 13 and relative cams 40, 41.

As clearly shown in FIG. 2, paths P, Q and A are parallel to one another only at portions $P_2$, $Q_2$.

Figure 5:
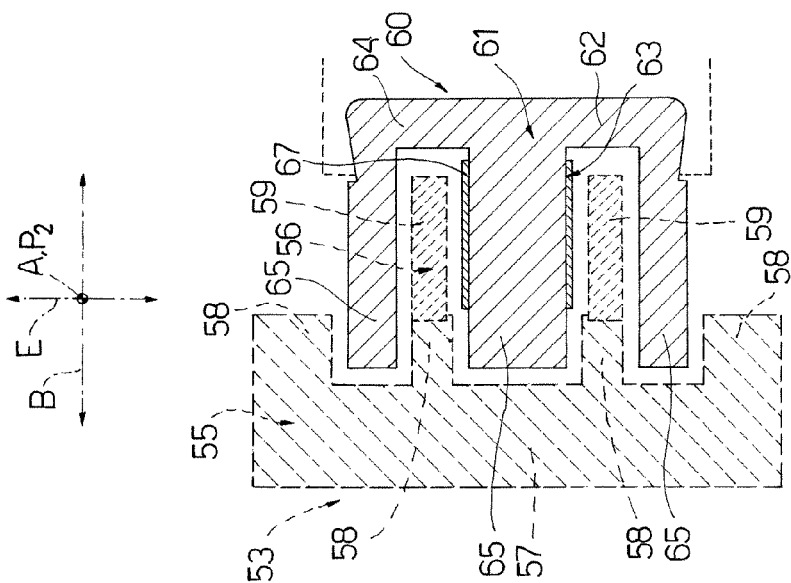
FIG. 5 shows a larger-scale section along line V-V in FIG. 4.
Figure 3:
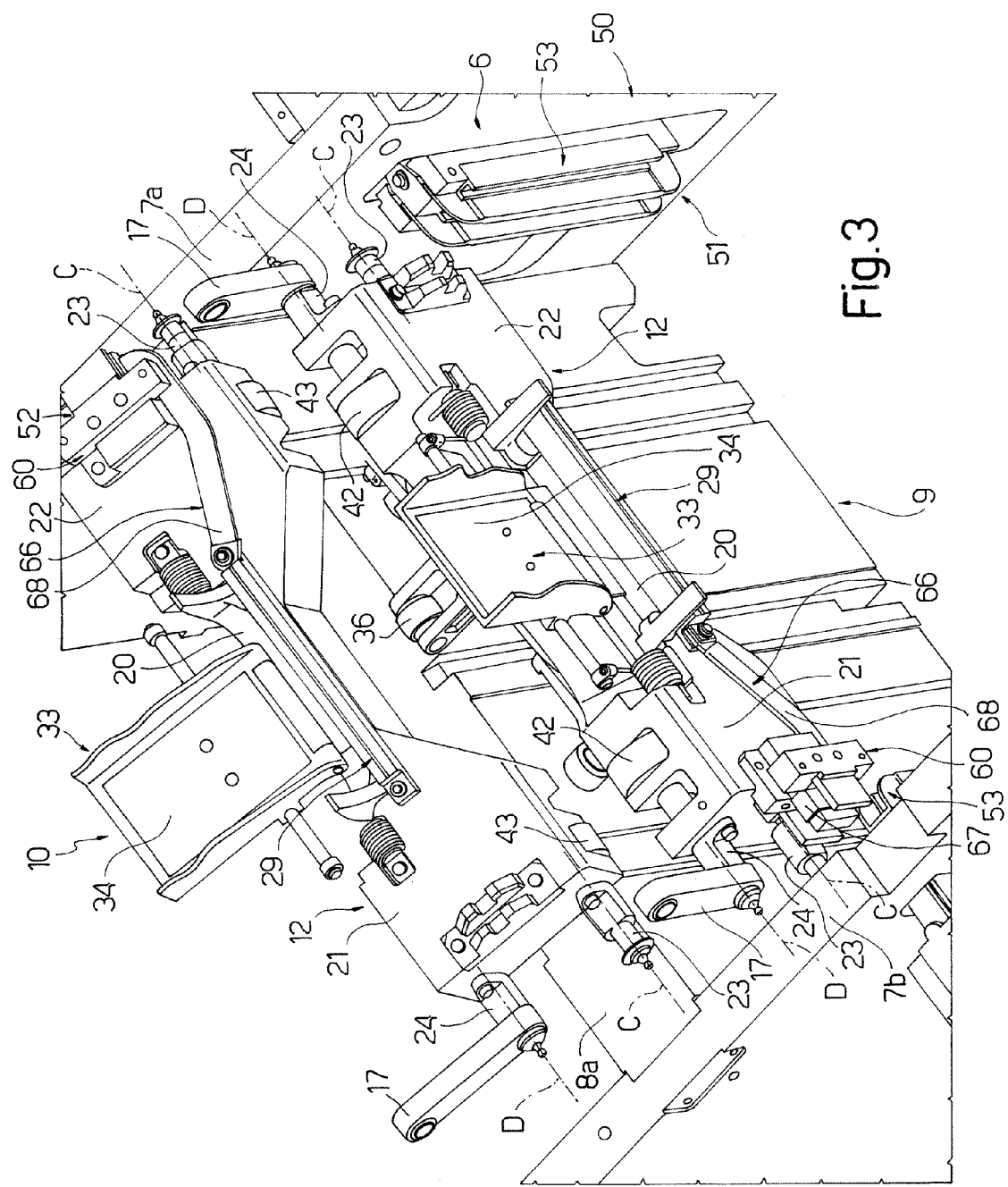
FIG. 3 shows a larger-scale view in perspective of part of the FIG. 1 sealing device.
Figure 4:
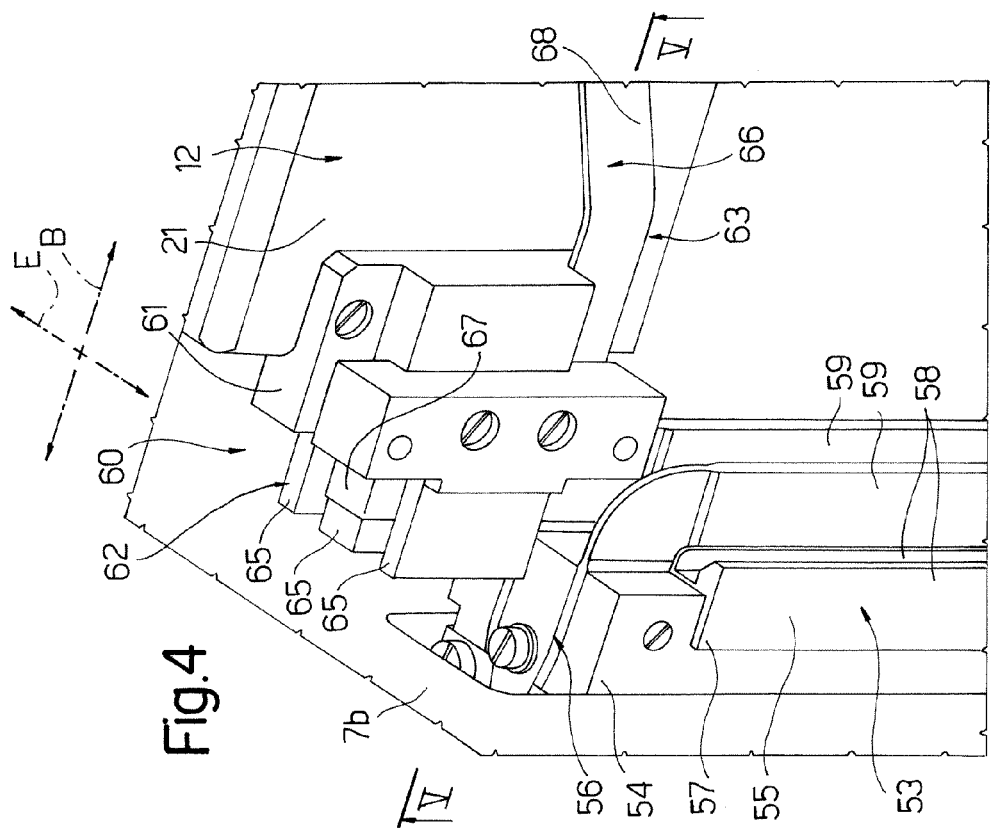
FIG. 4 shows a larger-scale view in perspective of a detail in FIG. 3.

With particular reference to FIGS. 3, 4, 5, device 1 also comprises an electromagnetic power assembly 50 for supplying electric energy to heating member 29 of each jaw 12 along portion $P_2$ of path P.

Power assembly 50 substantially comprises transmission means 51 connected to a fixed electric energy source (not shown) and fitted integrally to frame 6; and receiving means 52 fitted to jaws 12 and receiving electric energy by electromagnetic induction from transmission means 51 as jaws 12 travel past transmission means 51.

More specifically, transmission means 51 comprise two separate, facing transmission units 53 fixed to respective walls 7a, 7b, inside cavity 9, and extending symmetrically on opposite sides of path A and portion $P_2$ of path P of jaws 12.

More specifically, each transmission unit 53 is elongated in a direction parallel to path A and to portion $P_2$ of path P, and substantially comprises a supporting bracket 54 of plastic material, a fixed magnetic core 55, and a preferably copper primary winding 56 connected to the fixed electric energy source.

Fixed core 55 is defined by a rectangular plate elongated in the direction of path A, fixed to bracket 54, and projecting inwards of cavity 9 from bracket 54.

Fixed core 55 is made of magnetodielectric material, and comprises a parallelepiped-shaped base portion 58, from which a number of—in the example shown, four—parallel projections 58 project in direction B towards jaws 12 (FIG. 5).

Primary winding 56 comprises two elongated conductive plates 59 fixed to and projecting from respective central projections 58 of fixed core 55, so as to form extensions of projections 58 inwards of cavity 9.

Receiving means 52 comprise two series of receiving units 60 fitted alternately to enlargements 21, 22 of respective jaws 12, and which interact with respective transmission units 53.

Each receiving unit 60 (FIGS. 3 and 4) projects from a relative enlargement 21, 22 of a relative jaw 12, and substantially comprises a supporting bracket 61, a movable magnetic core 62, and a preferably copper secondary winding 63, which receives electric energy by electromagnetic induction from primary winding 56 as receiving unit 60 travels past relative transmission unit 53.

In the example shown, movable core 62 is defined by a body preferably made of ferrite, projecting from relative enlargement 21, 22 of relative jaw 12 towards relative wall 7a, 7b of frame 6, and having a preferably E-shaped section in a plane perpendicular to path A and to portion $P_2$ of path P.

More specifically, movable core 62 comprises a base portion 64 in the form of a rectangular plate, from which three parallel projections 65 project in direction B towards relative side wall 7a, 7b (FIG. 5).

In the example shown, secondary winding 63 comprises a plate conductor 66 having an end portion 67 wound to form one turn about central projection 65 of movable core 62; and an elongated portion 68 connecting end portion 67 to heating member 29.

Advantageously, when transmission and receiving means 51, 52 are interconnected by electromagnetic induction, i.e. along portion $P_2$ of path P, each receiving unit 60 and the relative transmission unit 53 are so arranged that conductive plates 59 of primary winding 56 and end portion 67 of secondary winding 63 are interjacent in direction B. In other words, along portion $P_2$ of path P, conductive plates 59 of each primary winding 56 face opposite sides of end portion 67 of relative secondary winding 63 in a direction E perpendicular to portion $P_2$ of path P, to path A, to direction B, and therefore to walls 8a, 8b of frame 6.

When transmission and receiving means 51, 52 are interconnected by electromagnetic induction, fixed and movable cores 55, 62 of each transmission unit 53 and the relative receiving unit 60 are preferably also interjacent in direction B, i.e. projections 58, 65 of one of cores 55, 62 are housed inside respective cavities bounded by projections 65, 58 of the other core 62, 55.

Number 53' in FIG. 6 indicates as a whole a variation of a transmission unit in accordance with the teachings of the present invention, and which is described below only insofar as it differs from transmission unit 53. Any parts of transmission unit 53' corresponding or equivalent to those of transmission unit 53 already described are indicated, where possible, using the same reference numbers.

Transmission unit 53' substantially differs from transmission unit 53 by comprising a fixed magnetic core 55' in the form a rectangular plate with no projections, and from which project two conductive plates 59' identical to conductive plates 59.

In this case, when transmission and receiving means 51, 52 are interconnected by electromagnetic induction, primary winding 56 and secondary winding 63 are interjacent in direction B (i.e. conductive plates 59' of one of primary windings 56 face opposite sides of end portion 67 of relative secondary winding 63 in direction E), but fixed core 55' and movable core 62 do not.

Figure 6:
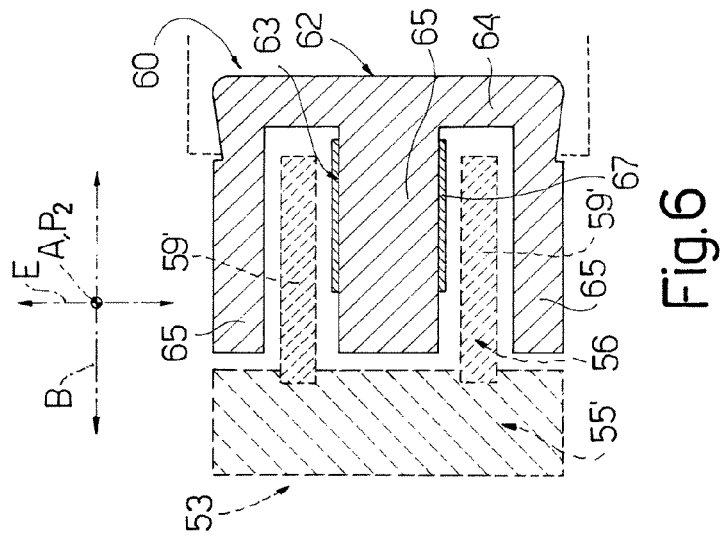
FIG. 6 shows the same section as in FIG. 5, of a variation of the FIG. 4 detail.
Figure 7:
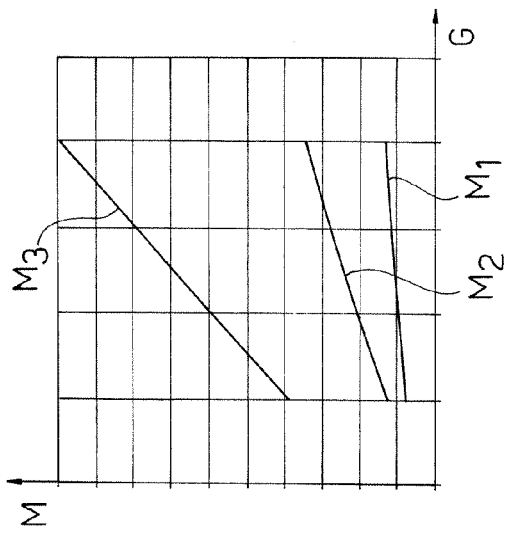
FIGS. 7 and 8 show comparative graphs of characteristic quantities of sealing devices in accordance with the teachings of the present invention, and known sealing devices.
Figure 8:
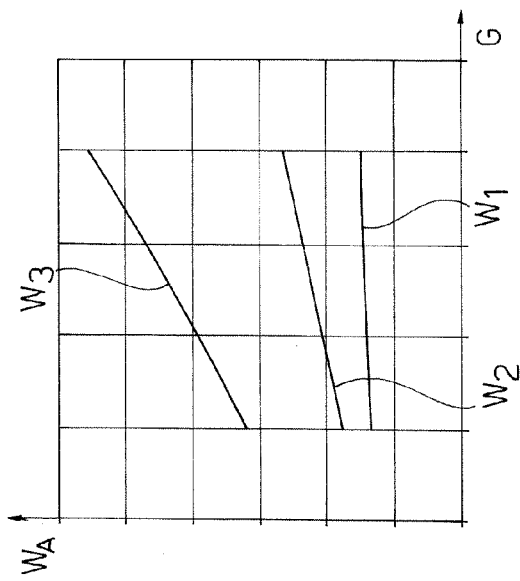

FIGS. 7 and 8 show two comparative test graphs of characteristic quantities of sealing devices 1 employing the FIGS. 5 and 6 configurations of fixed core 55, 55' and movable core 62, and a sealing device employing the known opposed E configuration of the fixed and movable cores, as described in Patent Application WO 00/64662, respectively.

More specifically, the FIG. 7 graph shows magnetizing current M as a function of the air gap G between the fixed and movable cores of the various sealing devices. As can be seen, magnetizing current M remains much lower for sealing devices 1 according to the invention (curves $M_1$ and $M_2$ for the FIGS. 5 and 6 configurations respectively) than for known sealing devices employing an opposed E configuration of the fixed and movable cores (curve $M_3$).

Moreover, as air gap G increases, magnetizing current M remains more or less constant ($M_1$) for the FIG. 5 configuration of sealing device 1, increases slightly ($M_2$) for the FIG. 6 configuration of sealing device 1, and increases sharply ($M_3$) for the known sealing device employing an opposed E configuration of the fixed and movable cores.

Similarly, the FIG. 8 graph shows apparent power $W_A$ as a function of the air gap G between the fixed and movable cores of the various sealing devices. As can be seen, apparent power $W_A$ remains much lower for sealing devices 1 according to the invention (curves $W_1$ and $W_2$ for the FIGS. 5 and 6 configurations respectively) than for known sealing devices employing an opposed E configuration of the fixed and movable cores (curve $W_3$).

Moreover, as air gap G increases, apparent power $W_A$ remains more or less constant ($W_1$) for the FIG. 5 configuration of sealing device 1, increases slightly ($W_2$) for the FIG. 6 configuration of sealing device 1, and increases sharply ($W_3$) for the known sealing device employing an opposed E configuration of the fixed and movable cores.

In short, the FIGS. 7 and 8 graphs show the FIG. 5 configuration of sealing device 1 to be characterized by lower apparent power $W_A$ values, to be more effective in transferring electric energy, and to be less sensitive to variations in the size of the air gap between fixed core 55 and movable core 62. Though still sensitive to variations in the size of the air gap between fixed core 55' and movable core 62, the FIG. 6 configuration is still far superior, in terms of electric energy transfer and low apparent power $W_A$, to the known solution employing an opposed E configuration of the fixed and movable cores.

Sealing device 1 operates as follows.

The two conveyors 10, 11 are rotated in opposite directions, as indicated by the arrows in FIG. 2, so that respective jaws 12 and 13 cooperate with tube 3 of packaging material from the end of respective portions $P_1$, $Q_1$ of paths P, Q and along respective portions $P_2$, $Q_2$ with a law of motion determined by the profiles of cams 40, 41.

The operating cycle will now be described in more detail with reference to one jaw 12 of conveyor 10 and the corresponding jaw 13 of conveyor 11; all the jaws 12 and 13 obviously performing the same cycle at time intervals depending on the output rate.

Along portions $P_1$ and $Q_1$, jaws 12 and 13 are brought together to gradually deform and eventually "flatten" tube 3 at a transverse band 44.

At the end of portions $P_1$, $Q_1$, devices 33 for controlling the volume of packages 2 are activated; and half-shells 34 of jaws 12 and 13 are brought together frontally to define a parallelepiped-shaped cavity defining the volume of container portion 45 of the package 2 being formed.

Along respective portions $P_2$, $Q_2$ of paths P, Q, jaws 12 and 13 are gripped firmly against tube 3; at which stage, receiving unit 60 of jaw 12 travels past relative transmission unit 53 and engages it in direction B.

More specifically, depending on the design of the fixed core (55 or 55'), receiving unit 60 is positioned, with respect to relative transmission unit 53, in either one of the configurations shown in FIGS. 5 and 6. In both cases, as jaw 12 travels along portion $P_2$ of path P, electric current is induced by primary winding 56 in secondary winding 63 of relative receiving unit 60 to electrically power heating member 29, which seals the two superimposed portions of packaging material forming band 44.

As receiving unit 60 disengages relative transmission unit 53 at the end of portion $P_2$ of path P, electric current ceases to be induced in secondary winding 63; at which point, jaws 12 and 13 release the newly formed sealing band 44 and withdraw from the strip of packages 2.

Clearly, changes may be made to sealing device 1 as described herein without, however, departing from the scope of the invention as defined by the accompanying Claims.

In particular, device 1 may feature one or two pairs of jaws 12, 13 acting cyclically on tube 3 of packaging material.

Moreover, the design of fixed and movable cores 55, 55', 62 may be inverted, and one of them may even comprise only two projections, i.e. be C-shaped in section in a plane perpendicular to path A.

Furthermore, the path along which the receiving units are moved may also have a curvilinear or circumferential shape; more specifically, the claimed sealing device may be advantageously implemented in spindle-type forming units as described in the introductory portion of the present description, wherein, for each blank, a heating element having a receiving unit is moved along a given path and, when travels past a relative fixed transmission unit, is electrically powered by inducing electric current.

The invention claimed is:

1. A sealing device for producing sealed packages filled with pourable food product from a sheet packaging material, said sealing device comprising:
   a supporting frame;
   forming means movable with respect to said frame along a given path to fold said sheet packaging material into a given shape;
   sealing means carried by said forming means to seal said sheet packaging material and form said packages; and
   electromagnetic power means for supplying electric energy to said sealing means, said power means comprising at least one primary winding fixed to said frame and connectable to an electric energy source, and a secondary winding movable along said path, powering said sealing means, and receiving electric energy by electromagnetic induction from said primary winding as said secondary winding travels past the primary winding;
   wherein when interconnected by electromagnetic induction, said primary winding and said secondary winding are arranged so as to have respective adjacent portions interjacent in a first direction crosswise to said path and so that said adjacent portions of said primary winding and said secondary winding face one another in a second direction perpendicular to said first direction and perpendicular to said path.

2. A device as claimed in claim 1 for producing sealed packages from a tube of sheet packaging material fed along a feed path parallel to said path of said forming means and filled continuously with a pourable food product, wherein said forming means comprise at least one pair of opposite jaws movable with respect to said frame to firmly grip said tube of packaging material at equally spaced cross sections, in that said sealing means are carried by a first of said jaws, and in that said secondary winding is also carried by said first jaw.

3. A device as claimed in claim 2, comprising a first conveyor having a number of first jaws and defining a first endless path along which said first jaws travel; and a second conveyor having a number of second jaws and defining a second endless path along which said second jaws travel; said first and second path comprising respective work portions adjacent to said path of the tube of packaging material and extending substantially symmetrically on opposite sides of said tube path, so that said first jaws cooperate with respective said second jaws to firmly grip and seal said tube at respective cross sections.

4. A device as claimed in claim 1, wherein said primary winding and said secondary winding are carried respectively by a fixed magnetic core secured to said frame, and by a movable magnetic core jointly displaceable with said sealing means; at least one of said cores having at least two projections projecting in said first direction towards the other said core when said primary winding and said secondary winding are interconnected by induction.

5. A device as claimed in claim 4, wherein the other said core is plate-shaped, and that one of said adjacent portions of said primary winding and said secondary winding is carried by one of said projections of said at least one of said cores, while the other said adjacent portion projects from the other said core.

6. A device as claimed in claim 4, wherein when interconnected by electromagnetic induction, said fixed core and said movable core are interjacent in said first direction.

7. A device as claimed in claim 6, wherein said fixed core and said movable core both have projections; and in that, when interconnected by electromagnetic induction, said projections of one of said cores are housed inside respective gaps bounded by the projections of the other core.

8. A device as claimed in claim 4 which produces the sealed packages from a tube of the sheet packaging material fed along a feed path parallel to said path of said forming means and filled continuously with a pourable food product, wherein said forming means comprise at least one pair of opposite jaws movable with respect to said frame to firmly grip the tube of packaging material at equally spaced cross sections, the sealing means being carried by a first of said jaws, and said secondary winding also being carried by said first jaw.

9. A device as claimed in claim 4, wherein said at least one of said cores is E-shaped in section in a plane perpendicular to said path.

10. A device as claimed in claim 9, wherein the other said core is plate-shaped, and that one of said adjacent portions of said primary winding and said secondary winding is carried by one of said projections of said at least one of said cores, while the other said adjacent portion projects from the other said core.

11. A device as claimed in claim 9, wherein when interconnected by electromagnetic induction, said fixed core and said movable core are interjacent in said first direction.

* * * * *